(12) United States Patent
Allmandinger et al.

(10) Patent No.: US 12,145,661 B2
(45) Date of Patent: Nov. 19, 2024

(54) ALTITUDE-BASED AERODYNAMIC ELEMENT CONTROL

(71) Applicant: Ford Global Technologies, LLC, Dearborn, MI (US)

(72) Inventors: Alex Allmandinger, Ferndale, MI (US); Michael Bastanipour, Ferndale, MI (US); Anthony Klepacki, Chicago, IL (US); Nicholas Kuhajda, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 17/679,479

(22) Filed: Feb. 24, 2022

(65) Prior Publication Data

US 2023/0264762 A1 Aug. 24, 2023

(51) Int. Cl.
 *B62D 37/02* (2006.01)
 *B62D 35/00* (2006.01)
(52) U.S. Cl.
 CPC ........... *B62D 37/02* (2013.01); *B62D 35/007* (2013.01)
(58) Field of Classification Search
 CPC ........ B62D 35/007; B62D 37/02; Y02T 10/82
 See application file for complete search history.

(56) References Cited

U.S. PATENT DOCUMENTS

| | | | |
|---|---|---|---|
| 4,810,022 A * | 3/1989 | Takagi | B62D 35/005 296/180.5 |
| 9,828,044 B2 | 11/2017 | Heil et al. | |
| 10,102,692 B2 | 10/2018 | Heil | |
| 10,189,513 B2 | 1/2019 | Heil | |
| 10,604,197 B2 | 3/2020 | Bray et al. | |
| 10,679,437 B1 | 6/2020 | Dudar | |
| 11,485,429 B2 * | 11/2022 | Yen | B62D 35/00 |
| 2004/0026954 A1 * | 2/2004 | Neel | B60J 1/2002 296/180.1 |
| 2021/0237810 A1 * | 8/2021 | Yen | B62D 37/02 |

* cited by examiner

*Primary Examiner* — Tyler J Lee
(74) *Attorney, Agent, or Firm* — Burr & Forman LLP; Lorne Forsythe

(57) ABSTRACT

An aerodynamics control system for a vehicle may include an aerodynamic element operably coupled to a vehicle body, an actuator assembly operably coupled to the aerodynamic element to control positioning of the aerodynamic element, an altitude sensor operably coupled to the vehicle to determine an altitude of the vehicle, and a controller operably coupled to the actuator and the altitude sensor to provide automatic control of the aerodynamic element via the actuator based on the altitude of the vehicle.

19 Claims, 8 Drawing Sheets

ALTITUDE-BASED AERODYNAMIC ELEMENT CONTROL

TECHNICAL FIELD

Example embodiments generally relate to vehicle aerodynamics and, more particularly, relate to controllable aerodynamic elements where such control is based on altitude.

BACKGROUND

Vehicles, and especially high performance vehicles, often employ aerodynamic devices that are designed to improve aerodynamic performance. These aerodynamic devices are often static. Because these aerodynamic devices are static, they may provide improved performance over only a limited set of vehicle conditions.

Thus, it may be desirable to develop aerodynamic devices that can be controlled responsive to various changing vehicle conditions.

BRIEF SUMMARY OF SOME EXAMPLES

In accordance with an example embodiment, an aerodynamics control system for a vehicle may be provided. The system may include an aerodynamic element operably coupled to a vehicle body, an actuator assembly operably coupled to the aerodynamic element to control positioning of the aerodynamic element, an altitude sensor operably coupled to the vehicle to determine an altitude of the vehicle, and a controller operably coupled to the actuator and the altitude sensor to provide automatic control of the aerodynamic element via the actuator based on the altitude of the vehicle.

In another example embodiment, a method of providing vehicle stability control to a vehicle having an aerodynamic element assembly may be provided. The method may include receiving altitude information from a sensor network of the vehicle while the vehicle is operating, determining, via a control algorithm executed by a controller, a position of the aerodynamic element assembly based on the altitude information, and operating an actuator operably coupled to the aerodynamic element assembly to move the aerodynamic element assembly to the determined position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
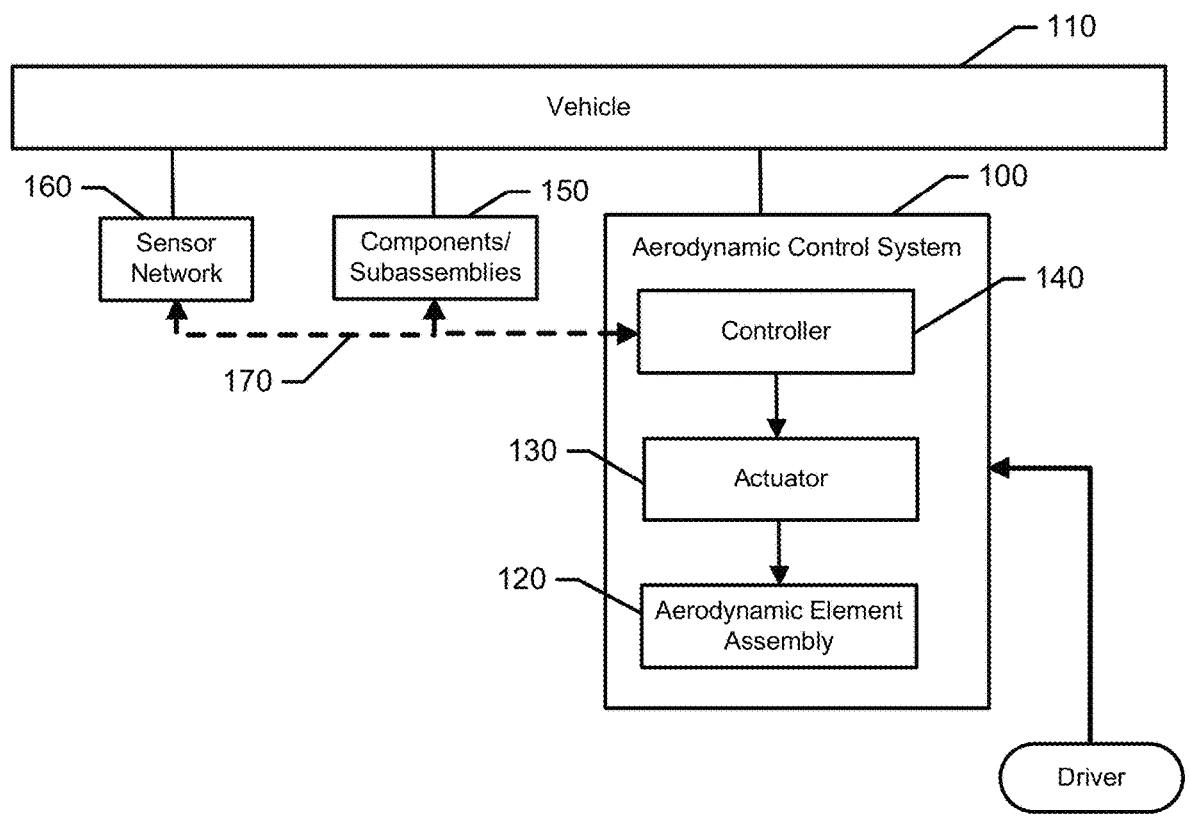
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may provide an improved system for aerodynamic element (or device) control that is responsive to dynamic changes to vehicle operating conditions. In particular, some example embodiments may employ altitude sensors that are capable of determining the current altitude, and changes in altitude, of the vehicle in real time or near real time. Given that air density changes with altitude, and further understanding that the air density is directly correlated to both lift and drag that is generated by aerodynamic elements, the altitude sensor measurements can be used to modulate aerodynamic element positioning based on altitude. As such, the aerodynamic element(s) may be controlled to optimize drag, lift and other aerodynamic properties across various changes in altitude.

An instant appreciation for the advantage of this innovation may be appreciated when considering the specific context of hill climb events such as, for example, the Pike's Peak International Hill Climb. In this event, vehicles traverse a course that increases in altitude by 4,725 feet, which correspondingly leads to massive changes in air density in a relatively short time. In this regard, while completing the climb, the air density reduces by 19%. This means that the vehicle lift and drag also changes by 19%, so the effectiveness of aerodynamic elements is diminished more and more as the climb progresses. Thus, in order to apply more aerodynamic downforce (or negative lift) to support higher cornering speeds by providing increased load on the tires, and therefore overall grip on the road, example embodiments adaptively apply more angle of attack to the aerodynamic element(s) as altitude increases.

Nevertheless, example embodiments need not necessarily be restricted only to racing vehicles, or to specific situations that involve rapid changes in altitude. Indeed, production vehicles may also benefit from example embodiments in that, for example, lift and drag adjustments initiated by aerodynamic elements on vehicles in Miami or New York (i.e., at or near sea level) are optimized differently than those on vehicles in Denver (i.e., at a mile above sea level). Thus, by employing example embodiments, vehicle performance and driver satisfaction may be improved for different types of vehicles and operational contexts.

FIG. 1 illustrates a block diagram of an aerodynamic control system 100 of an example embodiment. The components of the aerodynamic control system 100 may be incorporated into a vehicle 110 (e.g., via being operably coupled to a chassis of the vehicle 110 and/or electronic control systems of the vehicle 110). Of note, although the components of FIG. 1 may be connected to the chassis of the vehicle 110, it should be appreciated that such connection may be either direct or indirect. Moreover, some of the components of the aerodynamic control system 100 may be connected to the vehicle 110 via intermediate connections to other components either of the chassis or of other systems or components.

The aerodynamic control system 100 may include an aerodynamic device in the form of an aerodynamic element assembly 120. The aerodynamic element assembly 120 may include one or more individual aerodynamic elements or devices such as moveable surfaces that include, but not limited to, a wing (rear or located elsewhere), a splitter, a dive plane, a strake, a guide vane, hood vent, grill shutter, air guide member, and our the like. Moreover, the aerodynamic elements of the aerodynamic element assembly 120 are movable between either between deployed (i.e., extended) and retracted (i.e., withdrawn or not extended) positions, or to specific degrees of deployment (e.g., at selected angles of attack) in order to change the state of the aerodynamic element assembly 120 based on various conditions or information pertaining to vehicle status.

Thus, the aerodynamic element assembly 120 of example embodiments may be deployable and/or dynamically controlled. The "deployable" nature of the aerodynamic element assembly 120 relates to the fact that the individual surfaces of the aerodynamic element assembly 120 can be either deployed or retracted. The "dynamic" nature of the aerodynamic element assembly 120 refers to the fact that the aerodynamic element assembly 120 is enabled to be dynamically repositioned responsive to real time conditions and status information to actively improve stability of the vehicle 110. Thus, for example, when the operator or driver has enabled operation of the aerodynamic element assembly 120 (e.g., selected an operational mode in which the aerodynamic element assembly 120 in automatically controlled), the aerodynamic elements thereof may generally be retracted or extended to desired angles of attack or positions. In other words, various changes in conditions or vehicle status may dynamically cause the positioning of the aerodynamic element assembly 120 based on programmed rules or algorithms for control of the aerodynamic element assembly 120. Thus, a specific desired angle of attack for the individual surfaces of the aerodynamic assembly 120 may be actively controlled based on current driving conditions. However, the specific desired angle of attack may be different for different altitudes in order to provide the same effects on lift and drag.

In an example embodiment, the aerodynamic control system 100 may include a repositioning assembly (e.g., actuator 130), which may be provided as part of the aerodynamic control system 100 in order to reposition or move the aerodynamic element assembly 120 under the control of a controller 140 (or control module) of the aerodynamic control system 100. In some cases, the controller 140 may be part of a vehicle dynamic module (VDM) or other control system of the vehicle 110 that is configured to perform other tasks related or not related to aerodynamic control or performance management. However, the controller 140 could be a dedicated or standalone controller in some cases.

In an example embodiment, the controller 140 may receive information that is used to determine vehicle status (or environmental conditions) from or associated with various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 170.

The components or subassemblies 150 may include, for example, a brake assembly and/or a wheel assembly of the vehicle 110. Sensors associated with the brake assembly may provide inputs such as brake pedal position, or brake pressure, to the controller 140. Sensors associated with the wheel assembly may provide information about vehicle speed, wheel angle, etc. Other sensors of the sensor network 160 that may be operably coupled to the brake assembly, the wheel assembly or other parts of the vehicle 110 may provide information relating to brake torque, brake torque rate, vehicle acceleration, individual wheel speeds/angles, etc. Other examples of the components or subassemblies 150 and/or corresponding sensors of the sensor network 160 may provide information relating to latitude/longitude acceleration, pitch, yaw, pitch rate, yaw rate, altitude, air density, lateral G force, throttle position, aerodynamic load on the aerodynamic elements, selector button positions associated with chassis and/or vehicle control selections, etc. Thus, for example, the sensors may include an inclinometer, gyroscope, accelerometer, global positioning system (GPS) receiver, pressure sensors, air density sensors, and/or the like.

Accordingly, for example, the controller 140 may be able to receive numerous different parameters, indications and other information that may be related to or indicative of different situations or conditions associated with vehicle status. The controller 140 may then be configured to use the information received in association with the execution of one or more control algorithms that may be used to provide instructions to the actuator 130 in order to control a position of the aerodynamic element assembly 120.

Figure 2:
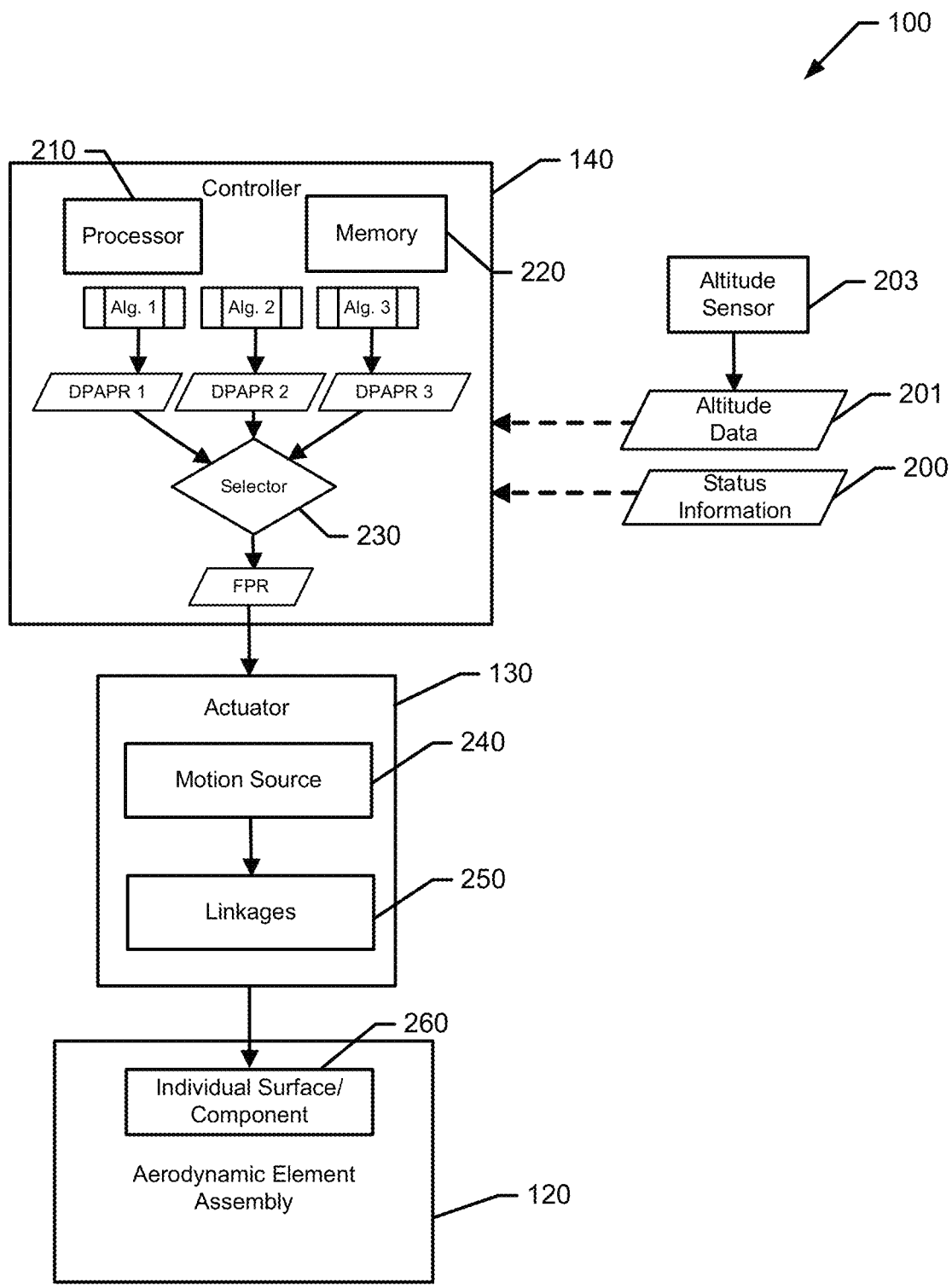
FIG. 2 illustrates a block diagram of some components of an aerodynamic control system of the vehicle control system of FIG. 1 in accordance with an example embodiment.

FIG. 2 illustrates a block diagram of various components of the aerodynamic control system 100 of one example embodiment in greater detail. In this regard, for example, the controller 140 may receive status information 200 (e.g., from the sensor network 160) via the vehicle communication bus 170. The status information 200 may include any or all of the types of information described above. Thus, for example, the status information 200 may include information regarding latitude/longitude acceleration, pitch, yaw, pitch rate, yaw rate, lateral G force, throttle position, wheel angle, wheel angle request, brake torque, brake torque request, aerodynamic load on the dive planes, selector button positions associated with chassis and/or vehicle control selections, etc.

In an example embodiment, the status information 200 may include, or be accompanied by, altitude data 201 (e.g., from altitude sensor 203). Thus, the fact that they are shown as separate inputs to the controller 140 in FIG. 2 does not necessarily indicate that the status information 200 and altitude data 201 are separate inputs (although they can be). Moreover, in some examples, the altitude data 201 may be replaced by other data that may be a proxy for altitude (e.g., air density), or data that can be converted into the altitude data 201. Thus, the altitude sensor 203 may also either directly measure altitude (e.g., such as via a GPS sensor), or may indirectly measure altitude (e.g., via air density, which may itself have component precursors such as temperature, moisture content, ambient pressure, and/or the like) and may therefore include corresponding component sensors (e.g., sensors for temperature, humidity, pressure, and/or the like).

Processing circuitry (e.g., a processor 210 and memory 220) at the controller 140 may process the status information 200 (and altitude data 201 if not a component of the status information 200) by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the status information 200/altitude data 201.

The processor 210 may be configured to execute the control algorithms in series or in parallel. However, in an example embodiment, the processor 210 may be configured to execute multiple control algorithms either based on prior selection or in parallel (e.g., simultaneously). To either select which algorithm to use, or to resolve conflicts between parallel solutions, a selector 230 may be used to determine which control algorithm to employ if there are multiple different options to select between, or to manage parallel communication of each output to respective individual surfaces/components 260 of the aerodynamic element assembly 120. For example, each control algorithm (e.g., Alg. 1, Alg. 2, and Alg 3 in FIG. 2) may be associated with a different mode, or a different aerodynamic element or surface. For example, one control algorithm (e.g., Alg. 1) may provide for control of the angle of attack of a rear wing, another control algorithm (e.g., Alg. 2) may control positioning of a splitter, and third control algorithm (e.g., Alg. 3) may control positioning of dive planes, strakes or air guide vanes. In any case, a selected one or each of the control algorithms may be executed to determine a corresponding aerodynamic element assembly position request (e.g., AEAPR 1, AEAPR 2, and AEAPR 3) that informs the actuator 130 where/how to position the corresponding individual surfaces/components 260 of the aerodynamic element assembly 120. In some embodiments, each individual one of the AEAPRs may have a corresponding table or set of tables for entry using any desired combination of the parameters provided as the status information 200/altitude data 201 to get an output indicative of a specific angle of attack at which the individual surfaces/components 260 of the aerodynamic element assembly 120 are to be positioned for the parameters currently experienced by the vehicle 110. The processor 210 may have a speed and processing power sufficient to ensure that the status information 200 received via the vehicle communication bus 170 is both received and processed in real time (or near real time) to cause corresponding changes to be made by the actuator 130.

In some cases, one of the aerodynamic element assembly position requests may be selected to be the final position request (FPR) that is communicated to the actuator 130, or each individual one of the AEAPRs may be communicated as its own FPR to the actuator 130 for each individual one of the components of the aerodynamic element assembly 120. Regardless of whether there is one or there are multiple final position requests, the final position request(s) may be provided to the actuator 130 to drive repositioning of the aerodynamic element assembly 120 based on the status information 200/altitude data 201 and the algorithm that processes the status information 200. The components of the actuator 130 may then physically move or operate to reposition the aerodynamic element assembly 120. This repositioning could happen any suitable way, but one example is shown in FIG. 2.

In this regard, as shown in FIG. 2, the actuator 130 may include a motion source 240 (e.g., an electric motor, a hydraulic actuator, a pneumatic actuator, or the like) that is operably coupled to linkages 250 that are in turn operably coupled to an individual surfaces/components 260 of the aerodynamic element assembly 120. Thus, for example, the linkages 250 may include mechanical structures (e.g., hinges, links, arms, rods, etc.) that operably couple motion from an output of the motion source 240 to individual surfaces/components 260 (i.e., individual wing, splitter, air guide members or elements, etc.) of the aerodynamic element assembly 120.

As can be appreciated from the description of FIG. 2, the controller 140 may be programmed to control different individual surfaces/components 260 differently for respective different conditions (i.e., different values of status information 200 and/or altitude data 201). The control may, as noted above, relate to specific angles of attack or specific positioning (e.g., extended vs. retracted, or a degree of extension) of the corresponding individual surfaces/components 260. Thus, the programming of the controller 140 or its selection or employment of algorithms may be different for respective different vehicle types (and the aerodynamic elements thereon). However, the selected algorithms may also be varied based on driver or operator input to select either more or less aggressive modes of control. Thus, for example, the selector 230 could also or alternatively select a driving mode that may dictate selection of a respective one of the control algorithms.

Figure 3:
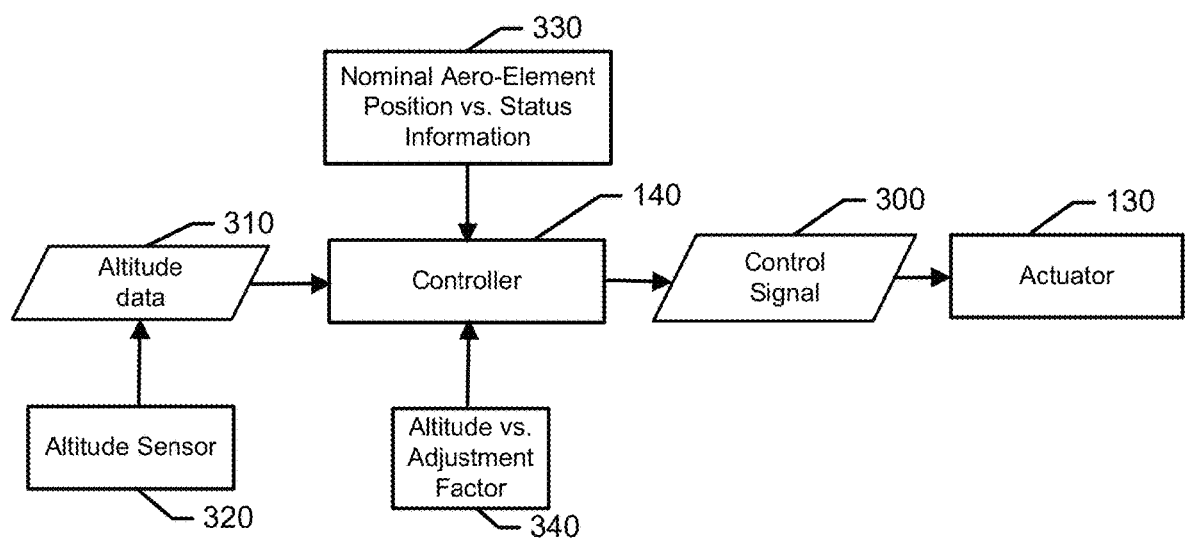
FIG. 3 illustrates block diagram of a vehicle control system programmed for a more direct calculation of aerodynamic element position based on altitude in accordance with an example embodiment.

The control algorithms themselves may also vary in constitution and operation in some embodiments. In this regard, as suggested above, some algorithms may perform a more direct calculation of aerodynamic element position based on altitude, and others may make such calculations more as a function of the respective component parameters that are measured as either a proxy or precursor for altitude measurements. FIG. 3 illustrates an example in which a more direct calculation method or programming strategy is employed.

In this regard, FIG. 3 shows the controller 140 providing a control signal 300 (e.g., an example of a final positioning request (FPR) of FIG. 2) to the actuator 130, where the control provided is based directly on altitude data 310 (e.g., an example of the altitude data 201 of FIG. 2). The altitude data 310 is provided by an altitude sensor 320 (e.g., an example of altitude sensor 203 of FIG. 2). The altitude sensor 320 may be a GPS sensor, or may be a collection of other sensors that operate together to estimate or determine altitude.

The controller 140 may normally control the position of individual surfaces/components 260 of the aerodynamic element assembly 120 based on a table (or series of tables) that define specific surface or aerodynamic element positions for each respective set of parameters measured as part of the status information 200. For example, wheel angle, brake request, vehicle speed and other parameters may dictate a nominal aerodynamic element position. These relationships may be recorded in a nominal aero-element position vs. status information table 330. The measured parameters of interest from the status information 200 may be used to enter the nominal aero-element position vs. status information table 330 to determine a nominal positioning for the corresponding aerodynamic element (e.g., one of the individual surfaces/components 260). This nominal position may then be modified for altitude using an altitude vs. adjustment factor table 340.

Figure 4:
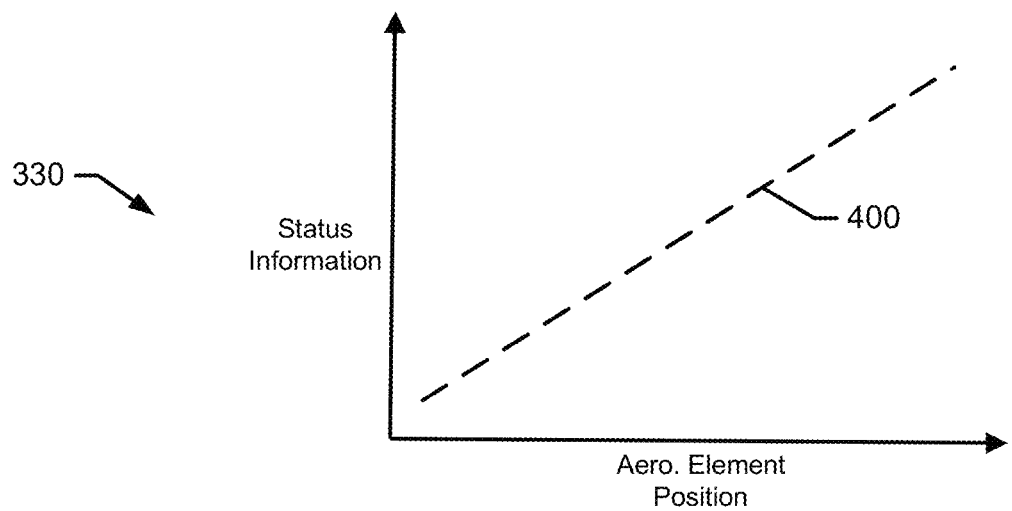
FIG. 4 illustrates a plot of nominal aerodynamic element position versus status information in accordance with an example embodiment.

FIG. 4 illustrates an example of the nominal aero-element position vs. status information table 330, in the form of a plot 400 of status information parameters for various different aerodynamic element positions. The controller 140 may enter into the nominal aero-element position vs. status information table 330 with status information to determine the nominal positioning of the aerodynamic element from the plot 400.

Figure 5:
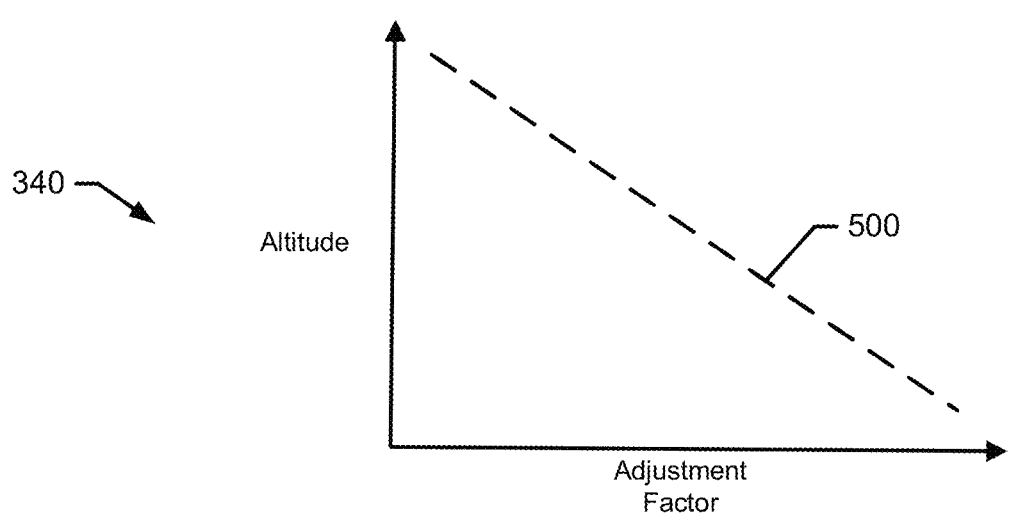
FIG. 5 illustrates a plot of an adjustment factor to the nominal aerodynamic element position versus altitude in accordance with an example embodiment.
Figure 6:
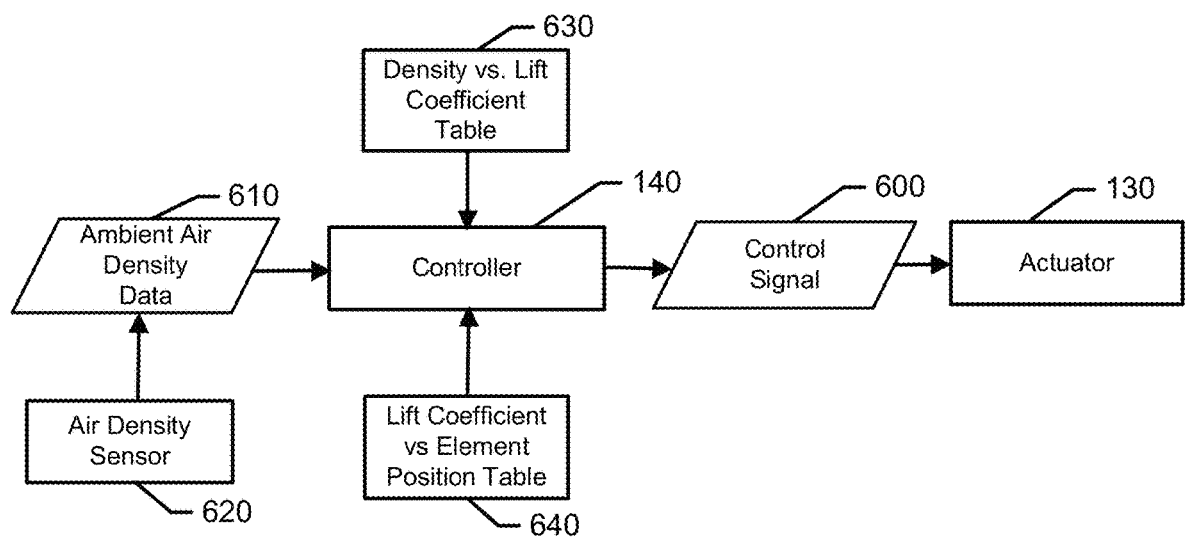
FIG. 6 illustrates block diagram of a vehicle control system programmed for an indirect calculation of aerodynamic element position based on a proxy or precursor for altitude in accordance with an example embodiment.

Meanwhile, FIG. 5 illustrates an example of the altitude vs. adjustment factor table 340, in the form of a plot 500 of altitude versus adjustment factor. Notably, as air density decreases, which is an expected result of increasing altitude, the angle of attack of an aerodynamic element that is needed to maintain the same level of lift must generally increase. Thus, whatever nominal positioning of the aerodynamic element that would occur for a given set of status information (e.g., for the brake request, wheel angle, vehicle speed, etc. of a given turn) should be magnified to some degree as altitude increases (or should be reduced as altitude decreases). The amount of such modification (increase or decrease) may be quantified for a given aerodynamic element and recorded in the table of FIG. 5. The controller 140 may therefore enter into the altitude vs. adjustment factor table 340 with altitude information to determine a modification (e.g., an adjustment factor) to the nominal positioning of the aerodynamic element from the plot 500. In some embodiments, the controller 140 may employ machine learning to improve performance of the control algorithms and/or update plots to optimize performance of the control algorithms over time. The vehicle will then tend to be more confidently controllable, and more predictably responsive to cornering situations at different altitudes. However, as noted above, altitude may not be directly measures, so sometimes the controller 140 may operate on proxy or precursor information. FIG. 6 illustrates such an example.

Referring now to FIG. 6, the controller 140 is again providing a control signal 600 (e.g., an example of a final positioning request (FPR) of FIG. 2) to the actuator 130, where the control provided is based indirectly on altitude data via a precursor or proxy value such as ambient air density data 610 (e.g., an example of the altitude data 201 of FIG. 2). The ambient air density data 610 may be provided by an air density sensor 620 (e.g., an example of altitude sensor 203 of FIG. 2). The air density sensor 620 may be a collection of other sensors that operate together to estimate or determine air density in some cases (e.g., a temperature, pressure and moisture content sensor, respectively).

The controller 140 may normally control the position of individual surfaces/components 260 of the aerodynamic element assembly 120 based on a table (or series of tables) that define specific surface or aerodynamic element positions for each respective set of parameters measured as part of the status information 200, as noted above, and then determine an adjustment to the nominal positioning. However, the position itself could directly be determined as an alternative approach described herein by virtue of the examples shown in FIGS. 6-8.

Figure 7:
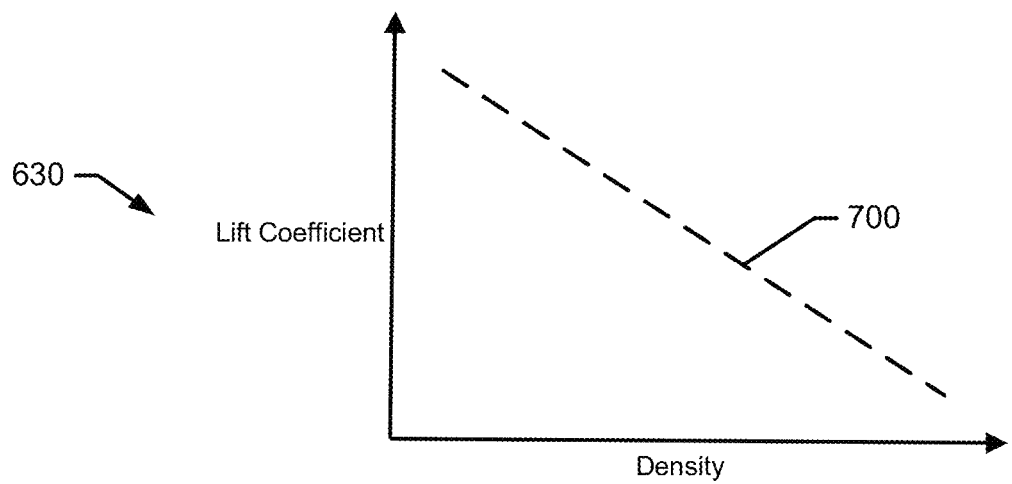
FIG. 7 illustrates a plot of lift coefficient versus air density in accordance with an example embodiment.
Figure 8:
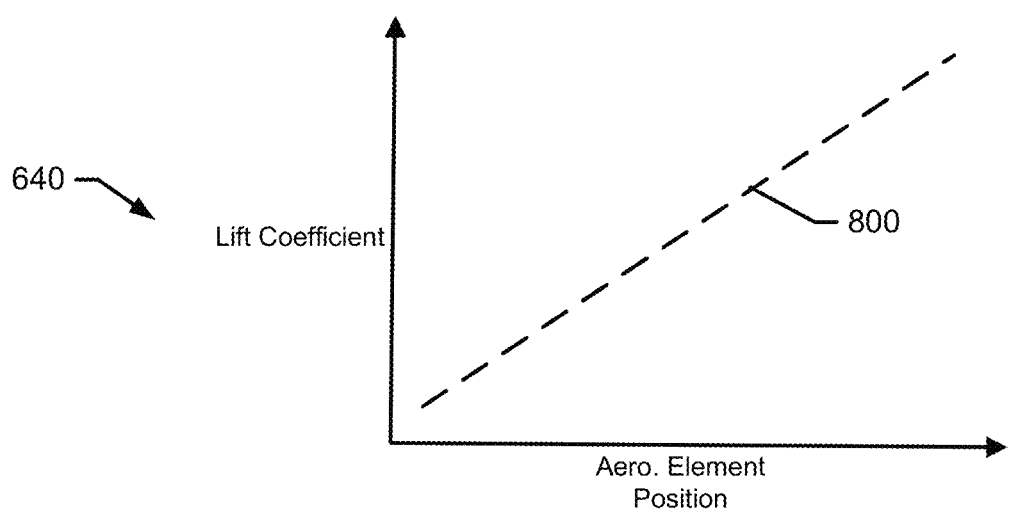
FIG. 8 illustrates a plot of lift coefficient versus aerodynamic element position in accordance with an example embodiment.

In this regard, for example, a density vs. lift coefficient table 630 may first be entered with the corresponding value of air density determined from the ambient air density data 610 to obtain a resulting lift coefficient, and then a lift coefficient vs. element position table 640 may be entered to determine the specific positioning of the aerodynamic element itself. FIG. 7 illustrates an example plot 700 of lift coefficient vs. air density that may form the density vs. lift coefficient table 630 of an example embodiment, and FIG. 8 illustrates an example plot 800 of lift coefficient vs. element position table 640.

As shown in FIG. 7, as air density increases, the lift coefficient decreases (or conversely, lift coefficient must increase as air density decreases) to maintain the same level of lift for a given aerodynamic element. The controller 140 may therefore use the ambient air density data 610 to enter the density vs. lift coefficient table 630 to use the plot 700 to determine the lift coefficient value that is presently being experienced at the aerodynamic element itself. Thereafter, using the plot 800 from the lift coefficient vs. element position table 640, the controller 140 may directly determine an aerodynamic element position and provide the control signal 600 to the actuator 130 accordingly.

Figure 9:
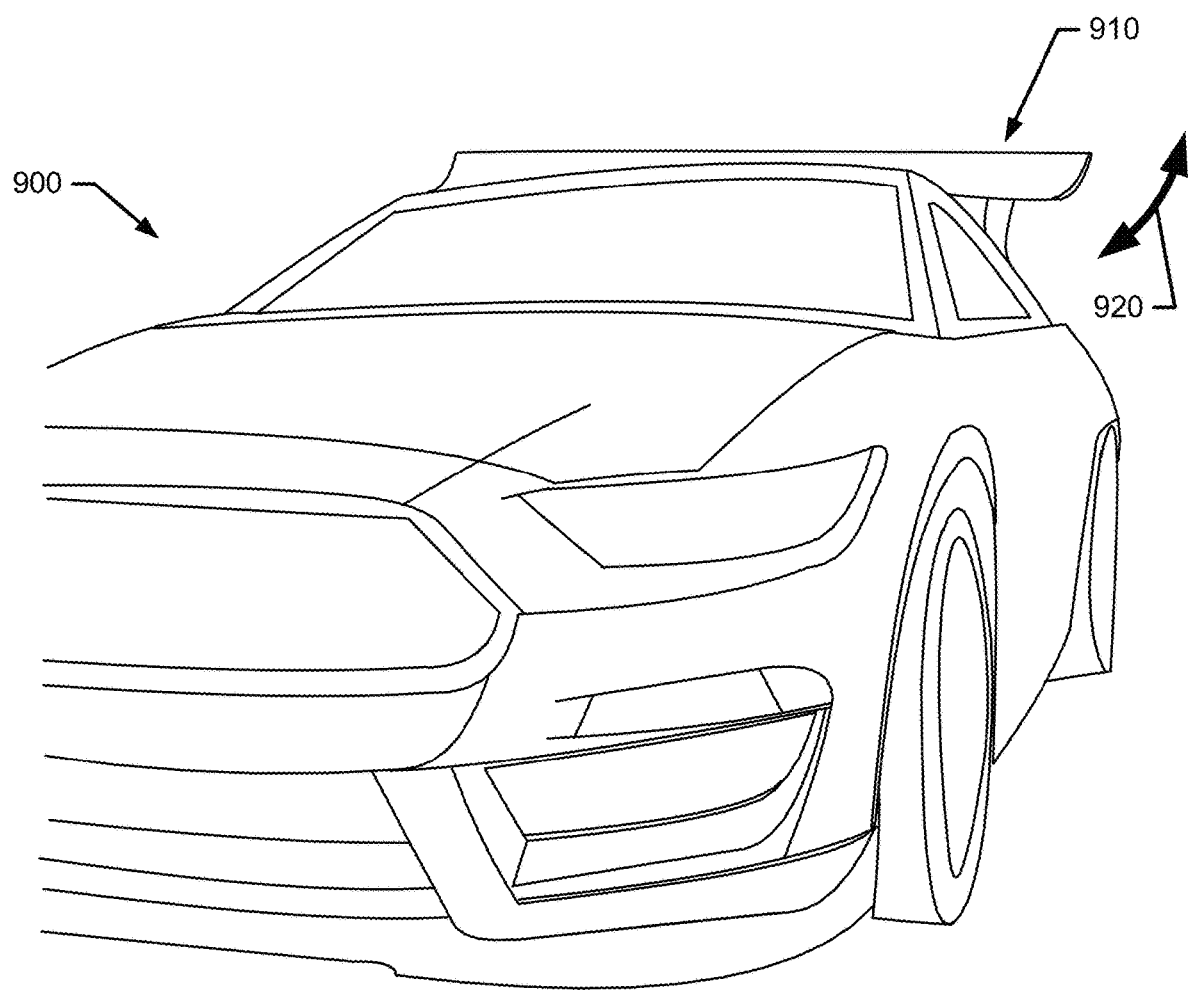
FIG. 9 illustrates a perspective view of a vehicle with a rear wing in accordance with an example embodiment.

FIG. 9 shows a vehicle 900 that is an example of the vehicle 110 of FIG. 1. The vehicle 900 includes an adjustable wing 910 that is an example of one of the individual surfaces/components 260 of FIG. 2. The wing 910 is adjustable to change the angle of attack as shown by double arrow 920 based on the operation of the controller 140 described above.

Figure 10:
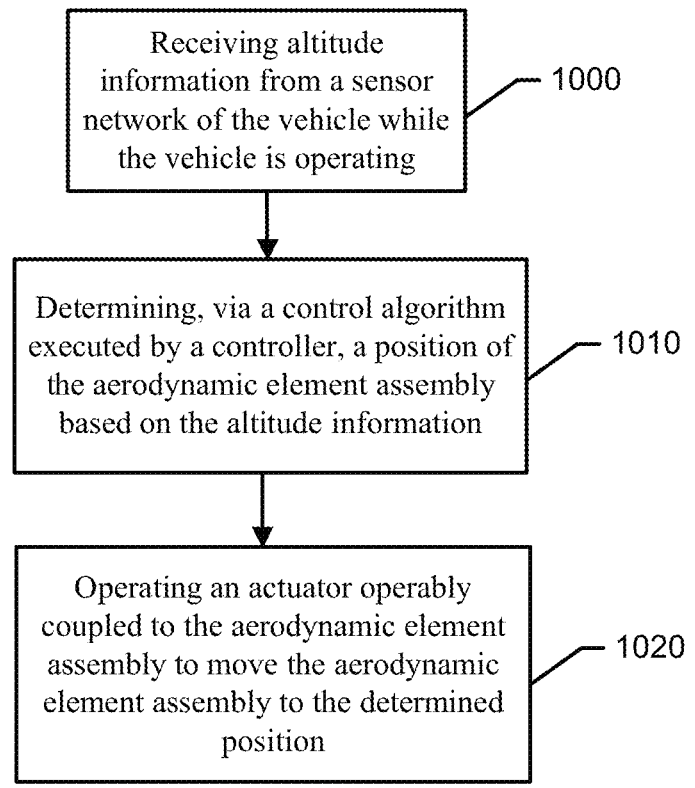
FIG. 10 illustrates a block diagram of a method of providing vehicle stability control to a vehicle having an aerodynamic element assembly in accordance with an example embodiment.

FIG. 10 illustrates a block diagram of a method of providing vehicle stability control to a vehicle having an aerodynamic element assembly disposed on the vehicle. The method may include method of providing vehicle stability control to a vehicle having an aerodynamic element assembly may be provided. The method may include receiving altitude information from a sensor network of the vehicle while the vehicle is operating at operation 1000. The method may further include determining, via a control algorithm executed by a controller, a position of the aerodynamic element assembly based on the altitude information at operation 1010, and operating an actuator operably coupled to the aerodynamic element assembly to move the aerodynamic element assembly to the determined position.at operation 1020.

An aerodynamics control system for a vehicle for supporting performance of the method described above may include an aerodynamic element operably coupled to a vehicle body, an actuator assembly operably coupled to the aerodynamic element to control positioning of the aerodynamic element, an altitude sensor operably coupled to the vehicle to determine an altitude of the vehicle, and a controller operably coupled to the actuator and the altitude sensor to provide automatic control of the aerodynamic element via the actuator based on the altitude of the vehicle.

The system or method of some embodiments may include additional features, modifications, augmentations and/or the like to achieve further objectives or enhance performance of the system/method. The additional features, modifications, augmentations and/or the like may be added in any combination with each other. Below is a list of various additional features, modifications, and augmentations that can each be added individually or in any combination with each other. For example, determining the position may include the controller referencing a first lookup table storing values for air density vs lift coefficient to determine a lift coefficient value, and may further include the controller referencing a second lookup table storing values for lift coefficient versus aerodynamic element position using the lift coefficient value to determine a target position of the aerodynamic element assembly. In an example embodiment, the aerodynamic element assembly may be a wing element, and the target position may define an angle of attack for the wing element. Additionally or alternatively, the aerodynamic element assembly may include a deployable or retractable aerodynamic surface, and the target position may define a deployed position (e.g., deployed or retracted, or a degree of deployment) for the aerodynamic surface. In an example embodiment, receiving the altitude information may include receiving the altitude information directly from an altitude sensor (e.g., a global positioning system (GPS) sensor). Alternatively or additionally, receiving the altitude information may include receiving the altitude information indirectly based on air density information (e.g., the altitude sensor may include an air density sensor to measure air density of ambient air proximate to the vehicle and, for example, the air density sensor may include a temperature sensor, a pressure sensor and/or a moisture sensor). In some cases, the controller may reference a lookup table storing values for altitude vs an adjustment factor to a nominal aerodynamic element position to provide the automatic control of the aerodynamic element based on the altitude of the vehicle and status information defining vehicle parameters from a sensor network of the vehicle in real time while the vehicle is driving. In such an example, the status information may include latitude/longitude acceleration, pitch, yaw, pitch rate, yaw rate, lateral G force, throttle position, wheel angle request, brake torque, or aerodynamic load on the aerodynamic element. Alternatively or additionally, the status information may include a brake torque request, vehicle speed and wheel angle. In some embodiments, the vehicle may include a plurality of aerodynamic elements, and the controller may employ a different control algorithm for positioning each respective one of the plurality of aerodynamic elements. In an example embodiment, the different control algorithm for the each of the plurality of aerodynamic elements may include a respective table or set of tables specific to a corresponding type of the each of the plurality of aerodynamic elements.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An aerodynamics control system for a vehicle, the system comprising:
    an aerodynamic element operably coupled to a vehicle body;
    an actuator assembly operably coupled to the aerodynamic element to control positioning of the aerodynamic element;
    an altitude sensor operably coupled to the vehicle to determine an altitude of the vehicle; and
    a controller operably coupled to the actuator and the altitude sensor to provide automatic control of the aerodynamic element via the actuator based on the altitude of the vehicle,
    wherein the controller references a first lookup table storing values for air density vs lift coefficient to determine a lift coefficient value for the automatic control of the aerodynamic element.

2. The system of claim 1, wherein the altitude sensor comprises an air density sensor to measure air density of ambient air proximate to the vehicle.

3. The system of claim 2, wherein the air density sensor comprises a temperature sensor, a pressure sensor, or a moisture sensor.

4. The system of claim 1, wherein the altitude sensor comprises a global positioning system (GPS) sensor.

5. The system of claim 1, wherein the controller references a second lookup table storing values for lift coefficient versus aerodynamic element position using the lift coefficient value to determine a target position of the aerodynamic element during provision of the automatic control of the aerodynamic element.

6. The system of claim 5, wherein the aerodynamic element assembly comprises a wing element, and
    wherein the target position defines an angle of attack for the wing element.

7. The system of claim 5, wherein the aerodynamic element assembly comprises a deployable or retractable aerodynamic surface, and
    wherein the target position defines a deployed position for the aerodynamic surface.

8. The system of claim 1, wherein the controller references a lookup table storing values for altitude vs an adjustment factor to a nominal aerodynamic element position to provide the automatic control of the aerodynamic element based on the altitude of the vehicle and status information defining vehicle parameters from a sensor network of the vehicle in real time while the vehicle is driving.

9. The system of claim 8, wherein the status information includes latitude/longitude acceleration, pitch, yaw, pitch rate, yaw rate, lateral G force, throttle position, wheel angle request, brake torque, or aerodynamic load on the aerodynamic element.

10. The system of claim 8, wherein the status information includes a brake torque request, vehicle speed and wheel angle.

11. The system of claim 1, wherein the vehicle includes a plurality of aerodynamic elements, and
    wherein the controller employs a different control algorithm for positioning each of the plurality of aerodynamic elements.

12. The system of claim 11, wherein the different control algorithm for the each of the plurality of aerodynamic elements includes a respective table or set of tables specific to a corresponding type of the each of the plurality of aerodynamic elements.

13. A method of providing vehicle stability control to a vehicle having an aerodynamic element assembly, the method comprising:
- receiving altitude information from a sensor network of the vehicle while the vehicle is operating;
- determining, via a control algorithm executed by a controller, a position of the aerodynamic element assembly based on the altitude information; and
- operating an actuator operably coupled to the aerodynamic element assembly to move the aerodynamic element assembly to the determined position,
- wherein determining the position comprises the controller referencing a first lookup table storing values for air density vs lift coefficient to determine a lift coefficient value.

14. The method of claim 13, wherein determining the position comprises the controller referencing a second lookup table storing values for lift coefficient versus aerodynamic element position using the lift coefficient value to determine a target position of the aerodynamic element assembly.

15. The method of claim 14, wherein the aerodynamic element assembly comprises a wing element, and
- wherein the target position defines an angle of attack for the wing element.

16. The method of claim 14, wherein the aerodynamic element assembly comprises a deployable or retractable aerodynamic surface, and
- wherein the target position defines a deployed position for the aerodynamic surface.

17. The method of claim 13, wherein the receiving the altitude information comprises receiving the altitude information directly from an altitude sensor.

18. The method of claim 13, wherein the receiving the altitude information comprises receiving the altitude information indirectly based on air density information.

19. An aerodynamics control system for a vehicle, the system comprising:
- an aerodynamic element operably coupled to a vehicle body;
- an actuator assembly operably coupled to the aerodynamic element to control positioning of the aerodynamic element;
- an altitude sensor operably coupled to the vehicle to determine an altitude of the vehicle; and
- a controller operably coupled to the actuator and the altitude sensor to provide automatic control of the aerodynamic element via the actuator based on the altitude of the vehicle,
- wherein the controller references a lookup table storing values for altitude vs an adjustment factor to a nominal aerodynamic element position to provide the automatic control of the aerodynamic element based on the altitude of the vehicle and status information defining vehicle parameters from a sensor network of the vehicle in real time while the vehicle is driving.

* * * * *